US008484580B2

(12) United States Patent
Ishii

(10) Patent No.: US 8,484,580 B2
(45) Date of Patent: Jul. 9, 2013

(54) CONTENT PRESENTATION DEVICE, CONTENT PRESENTATION METHOD, AND INFORMATION STORAGE MEDIUM

(75) Inventor: Kazuo Ishii, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 749 days.

(21) Appl. No.: 11/926,225

(22) Filed: Oct. 29, 2007

(65) Prior Publication Data
US 2008/0189611 A1    Aug. 7, 2008

(30) Foreign Application Priority Data

Dec. 12, 2006    (JP) ................................. 2006-335170
Dec. 12, 2006    (JP) ................................. 2006-335171

(51) Int. Cl.
*G06F 3/048*      (2006.01)

(52) U.S. Cl.
USPC .............................. 715/850; 345/440; 703/13

(58) Field of Classification Search
USPC ........................... 715/730, 852, 850; 345/440
See application file for complete search history.

(56) References Cited

U.S. PATENT DOCUMENTS

| 6,556,225 | B1 * | 4/2003 | MacPhail ...................... 715/848 |
| 7,146,576 | B2 * | 12/2006 | Chang et al. .................. 715/848 |
| 7,340,678 | B2 * | 3/2008 | Chiu et al. ..................... 715/734 |
| 7,433,885 | B2 * | 10/2008 | Jones ................................. 1/1 |
| 7,523,411 | B2 * | 4/2009 | Carlin ........................... 715/782 |
| 2002/0180809 | A1 * | 12/2002 | Light et al. .................... 345/852 |
| 2005/0134945 | A1 * | 6/2005 | Gallagher ...................... 358/527 |
| 2005/0188326 | A1 * | 8/2005 | Ikeda ............................. 715/788 |
| 2006/0112092 | A1 * | 5/2006 | Ziou et al. ......................... 707/5 |
| 2008/0034326 | A1 * | 2/2008 | Chiu et al. ..................... 715/849 |

FOREIGN PATENT DOCUMENTS

JP    2006-268551    10/2006

OTHER PUBLICATIONS

TouchGraph LLC, Ranked-Similarity-List Browser. (Apr. 25, 2006). http://web.archive.org/web/20060425104534/http://touchgraph.com/TG_RSLB_FullInstructions.html.*

* cited by examiner

*Primary Examiner* — Ramsey Refai
*Assistant Examiner* — Di Xiao
(74) *Attorney, Agent, or Firm* — Katten Muchin Rosenman LLP

(57) ABSTRACT

A content presentation device including a presentation screen production unit for producing display data related to a presentation screen on which images representative of a subset of contents among a plurality of contents together with a mutual relationship among the subset are shown, based on presentation data stored in a presentation data storage memory, the presentation storage memory storing plural kinds of presentation data based on any of which display data about the presentation screen is produced; and an instruction determination unit for determining whether a switching instruction for switching the presentation screen is input while the presentation screen is displayed, the switching instruction designating one of the contents represented by one of the images shown on the presentation screen, where the presentation screen production unit displaying an image representative of the one of the contents designated by the switching instruction at a predetermined position of the presentation screen.

10 Claims, 15 Drawing Sheets

FIG.12A

| Space |
|---|
| Block00001<br>(COORDINATES, BLOCK SIZE, CONTENT NUMBER) |
| Block00002<br>(COORDINATES, BLOCK SIZE, CONTENT NUMBER) |
| Block00003<br>(COORDINATES, BLOCK SIZE, CONTENT NUMBER) |
| ... |
| Block00100<br>(COORDINATES, BLOCK SIZE, CONTENT NUMBER) |

FIG.12B

| Guide |
|---|
| Guide ID=1<br>(COORDINATES, NAME, IMAGE URL, RADIUS) |
| Guide ID=2<br>(COORDINATES, NAME, IMAGE URL, RADIUS) |
| ... |
| Guide ID=20<br>(COORDINATES, NAME, IMAGE URL, RADIUS) |

FIG.12C

| Block00001 |
|---|
| Content ID=1<br>(COORDINATES, TITLE, ARTIST, ALBUM, GENRE, SUB-GENRE, MUSIC URL, IMAGE URL) |
| Content ID=23<br>(COORDINATES, TITLE, ARTIST, ALBUM, GENRE, SUB-GENRE, MUSIC URL, IMAGE URL) |
| Content ID=58<br>(COORDINATES, TITLE, ARTIST, ALBUM, GENRE, SUB-GENRE, MUSIC URL, IMAGE URL) |
| ... |
| Content ID=233<br>(COORDINATES, TITLE, ARTIST, ALBUM, GENRE, SUB-GENRE, MUSIC URL, IMAGE URL) |

FIG.12D

| CC TABLE 00001 |
|---|
| Content ID=1<br>(COORDINATES, TITLE, ARTIST, ALBUM, GENRE, SUB-GENRE) |
| Content ID=99<br>(COORDINATES, TITLE, ARTIST, ALBUM, GENRE, SUB-GENRE) |
| Content ID=222<br>(COORDINATES, TITLE, ARTIST, ALBUM, GENRE, SUB-GENRE) |
| Word ID=1 (KEYWORD NAME) |
| Word ID=12 (KEYWORD NAME) |
| Word ID=58 (KEYWORD NAME) |
| CC link (ID=1-ID=99, WID=1) |
| CC link (ID=1-ID=222, WID=12) |
| CC link (ID=99-ID=222, WID=58) |

FIG.12E

| CS TABLE 00001 |
|---|
| Content ID=1<br>(COORDINATES, TITLE, ARTIST, ALBUM, GENRE, SUB-GENRE) |
| Word ID=1 (KEYWORD NAME) |
| Word ID=12 (KEYWORD NAME) |
| Word ID=58 (KEYWORD NAME) |

FIG.17A
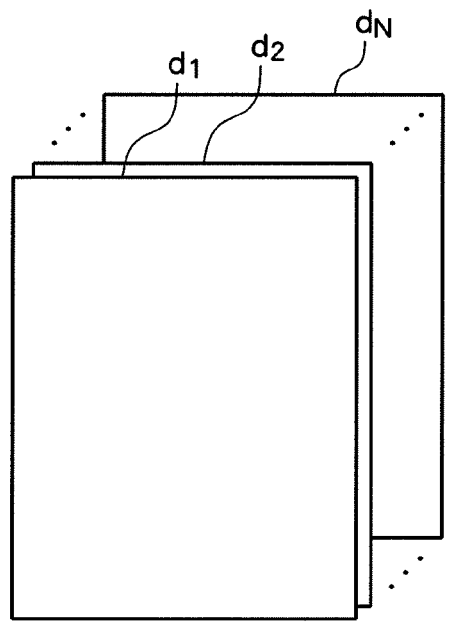
FIG.17B
| $d_n$ | |
|---|---|
| Wi | TF |
| W1 | 2 |
| W2 | 3 |
| W5 | 4 |
| W6 | 3 |
FIG.18A
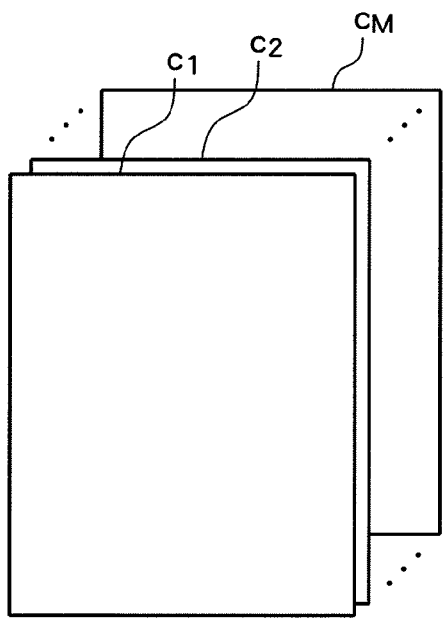
FIG.18B
| $C_m$ | |
|---|---|
| Wi | TF |
| Artist 1 | 2 |
| Album 1 | 1 |
| Title 1 | 1 |
| W1 | 1 |
| W2 | 1 |
| W3 | 0.5 |
| W4 | 0.5 |
| W5 | 0.5 |

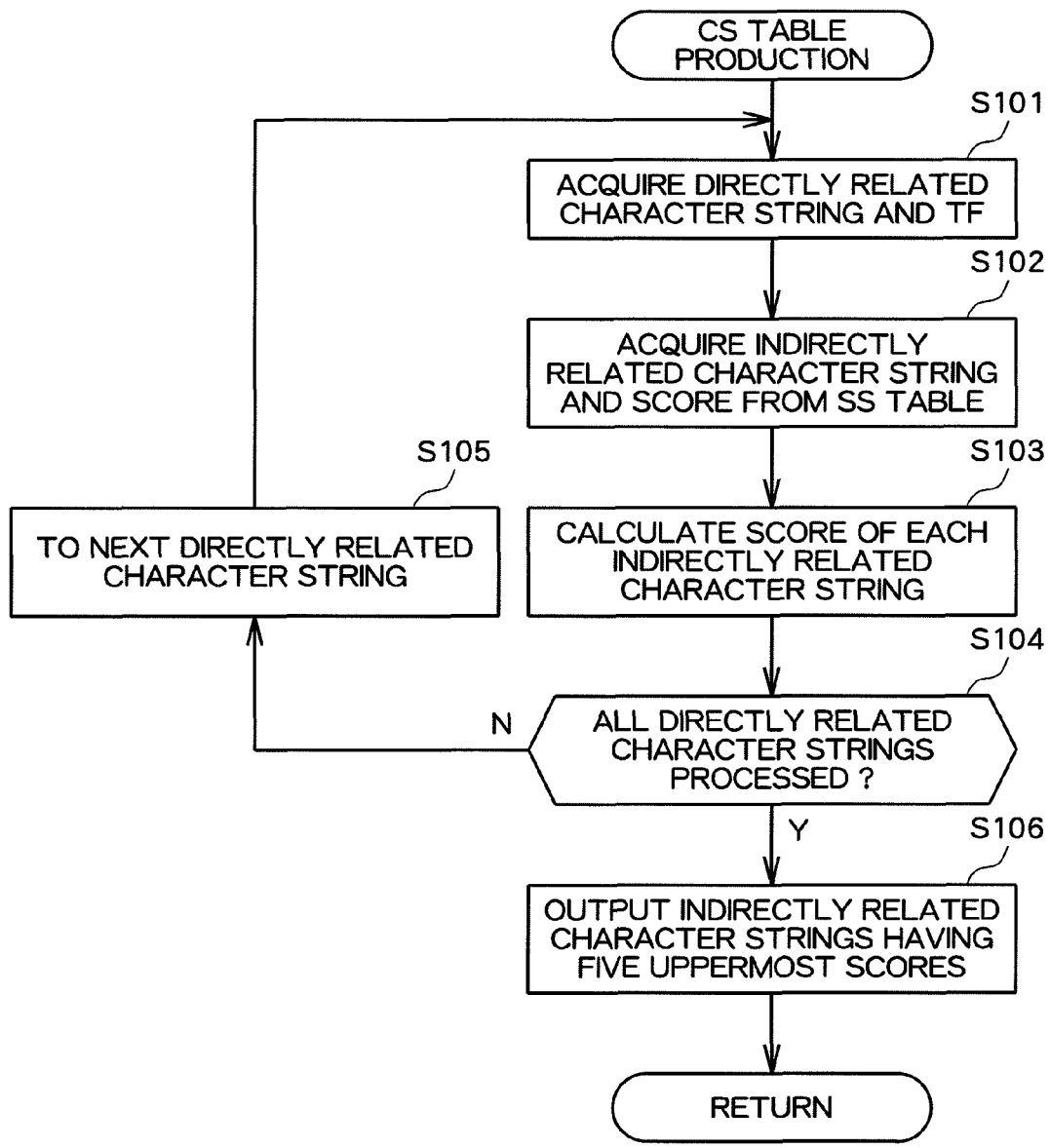

CONTENT PRESENTATION DEVICE, CONTENT PRESENTATION METHOD, AND INFORMATION STORAGE MEDIUM

BACKGROUND OF THE INVENTION

1. Field of the Invention

The present invention relates to a content presentation device, a content presentation method, and an information storage medium.

2. Description of the Related Art

An environment in which various contents, such as images, music, photographs, websites, and so forth, are readily obtainable is becoming established, and accordingly a need has arisen for a user interface for enabling the user to promptly obtain their desired content from among those.

With the above background, Japanese Patent Laid-open Publication No. 2006-268551 proposes a system for presenting to a user an image showing a picture obtained by viewing a virtual three dimensional space where icons representative of a lot of contents are placed according to the mutual relationship, from a predetermined viewpoint defined therein. With this system, the user can know at a glance the relationship among the contents.

According to this background art, however, in which icons representative of the contents are placed according to a predetermined criterion, it is likely, for example, that two icons representative of contents which can be determined similar to each other according to one criterion be placed so apart from each other according to another criterion that the user cannot readily find the icons.

The present invention has been conceived in view of the above, and aims to provide a content presentation device, a content presentation method, and an information storage medium for selectively displaying presentation screens which exhibit content relationships according to a plurality of criteria so that the user can readily find their desired content.

SUMMARY OF THE INVENTION

In order to address the above-described problem, according to one aspect of the present invention, there is provided a content presentation device, comprising presentation screen production means for producing display data about a presentation screen on which images representative of any subset of contents among a plurality of contents together with a mutual relationship among the subset are shown, based on any kind of presentation data stored in presentation data storage means, the presentation storage means storing plural kinds of presentation data based on any of which display data about the presentation screen is produced, and instruction determination means for determining whether or not a switching instruction for switching the presentation screen is issued while the presentation screen is displayed, the instruction including a designation of one of the contents represented by the images shown on the presentation screen, wherein the presentation screen production means produces, when the switching instruction is issued, display data about a presentation screen where the images representative of the subset of contents among the plurality of contents, including content concerning the designation which is made when issuing the switching instruction, are shown, based on presentation data of other kinds stored in the presentation data storage means.

According to another aspect of the present invention, there is provided a content presentation method, comprising a step of producing display data about a presentation screen on which images representative of any subset of contents among a plurality of contents together with a mutual relationship among the subset are shown, based on any kind of presentation data stored in presentation data storage means, the presentation storage means storing plural kinds of presentation data based on any of which display data about the presentation screen is produced; a step of determining whether or not a switching instruction for switching the presentation screen is issued while the presentation screen is displayed, the instruction including a designation of one of the contents represented by the images shown on the presentation screen; and a step of producing, when the switching instruction is made, display data about the presentation screen where the images representative of the subset of contents among the plurality of contents, including content concerning the designation which is made when issuing the switching instruction, are shown, based on presentation data of other kinds stored in the presentation data storage means.

According to still another aspect of the present invention, there is provided an information storage medium storing a program for causing a computer to function as presentation data storage means for storing plural kinds of presentation data based on which display data about a presentation screen where images representative of any subset of contents among a plurality of contents and a mutual relationship among the subset are shown; presentation screen production means for producing, based on any kind of presentation data stored in the presentation data storage means, display data about the presentation screen; and instruction determination means for determining whether or not a switching instruction for switching the presentation screen is issued while the presentation screen is displayed, the instruction including a designation of one of the contents represented by the images shown on the presentation screen, wherein the presentation screen production means produces, when the switching instruction is issued, display data about the presentation screen where the images representative of some desired contents among the plurality of contents, including content concerning the designation which is made when issuing the switching instruction, are shown, based on presentation data of other kind stored in the presentation data storage means. The computer may be comprised of a personal computer, a server computer, various kinds of game machines, a portable phone, a portable data assistant, and so forth. The program may be prepared as program products in various formats, such as a computer readable information storage medium storing the program, a downloadable program, and so forth.

According to the present invention, images representative of any subset of contents among a plurality of contents are shown on the presentation screen. The presentation screen exhibits mutual relationships among the contents, and is selectively prepared based on any of a plurality kinds of presentation data (describing criteria for content relationship). Then, when the user issues a switching instruction while the presentation screen is displayed, the current presentation screen is switched to another presentation screen prepared based on another kind of presentation data. In the above, the presentation screen shown after the switching shows an image representative of the content designated in the switching. That is, the user, by instructing switching of the presentation screens while designating content, can know the mutual relationship between the designated content and other content by looking at a presentation screen prepared based on another kind of presentation data. In this manner, according to the present invention, it is possible to selectively display the content presentation screens according to a plurality of criteria. Consequently, the user can readily find their desired content.

Also, in one embodiment of the present invention, the content presentation device may further comprise related character string storage means for storing, so as to correspond to each of a plurality of character strings, at least one character string related to that character string; content related character string acquisition means for acquiring, for each of the plurality of contents, at least one character string related to that content; and related content selection means for selecting, according to the at least one character string related to respective content of the plurality of contents acquired by the content related character string acquisition means and the at least one character string related to a respective character string of the plurality of character strings stored in the related character string storage means, at least one content which is made related to predetermined content among the plurality of contents, based on content stored in the related character string storage means.

Also, in one embodiment of the present invention, the content presentation method may further comprise a content related character string acquiring step of acquiring, for each of the plurality of contents, at least one character string related to that content; and a related content selection step of selecting, according to the at least one character string related to respective content of the plurality of contents acquired by the content related character string acquisition means and the at least one character string related to a respective character string of the plurality of character strings stored in the related character string storage means, at least one content which is made related to predetermined content among the plurality of contents, based on content stored in the related character string storage means.

Also, in one embodiment of the present invention, the information storage medium may store a program for causing a computer to function as related character string storage means for storing, so as to correspond to each of a plurality of character strings, at least one character string related to that character string; content related character string acquisition means for acquiring, for each of the plurality of contents, at least one character string related to that content; and related content selection means for selecting, according to the at least one character string related to respective content of the plurality of contents acquired by the content related character string acquisition means and the at least one character string related to a respective character string of the plurality of character strings stored in the related character string storage means, at least one content which is made related to predetermined content among the plurality of contents, based on content stored in the related character string storage means. The computer may include a personal computer, a server computer, various kinds of game machines, a portable phone, and so forth. The program may be stored in various kinds of computer readable information storage media, such as a CD-ROM, a DVD-ROM, and so forth.

According to the present invention, for a character string, a related character string thereof is stored so as to be related to that character string in the related character string storage means. Then, for each of a plurality of contents, a character string related to that content is obtained. Then, according to the content stored in the related character string storage means and a character string related to each content, content which is made related to predetermined content is selected based on the content stored in the related character string storage means. According to the present invention, as related content is selected according to the content stored in the related character string storage means, it is possible to select content that is indirectly related to the predetermined content. This makes it possible to reliably select mutually related contents, while reducing the degree of dependence on the content of a character string related to the content.

BRIEF DESCRIPTION OF THE DRAWINGS

FIG. 12 is a diagram schematically showing the content stored in a presentation data storage unit;

FIG. 17 is a diagram schematically showing document directly related character string data;

FIG. 18 is a diagram schematically showing content directly related character string data;

FIG. 21 is a flowchart showing a CS table production process;

FIG. 22 is a diagram schematically showing an SC table;

DESCRIPTION OF THE PREFERRED EMBODIMENTS

In the following, one embodiment of the present invention will be described in detail based on the accompanying drawings.

Figure 1:
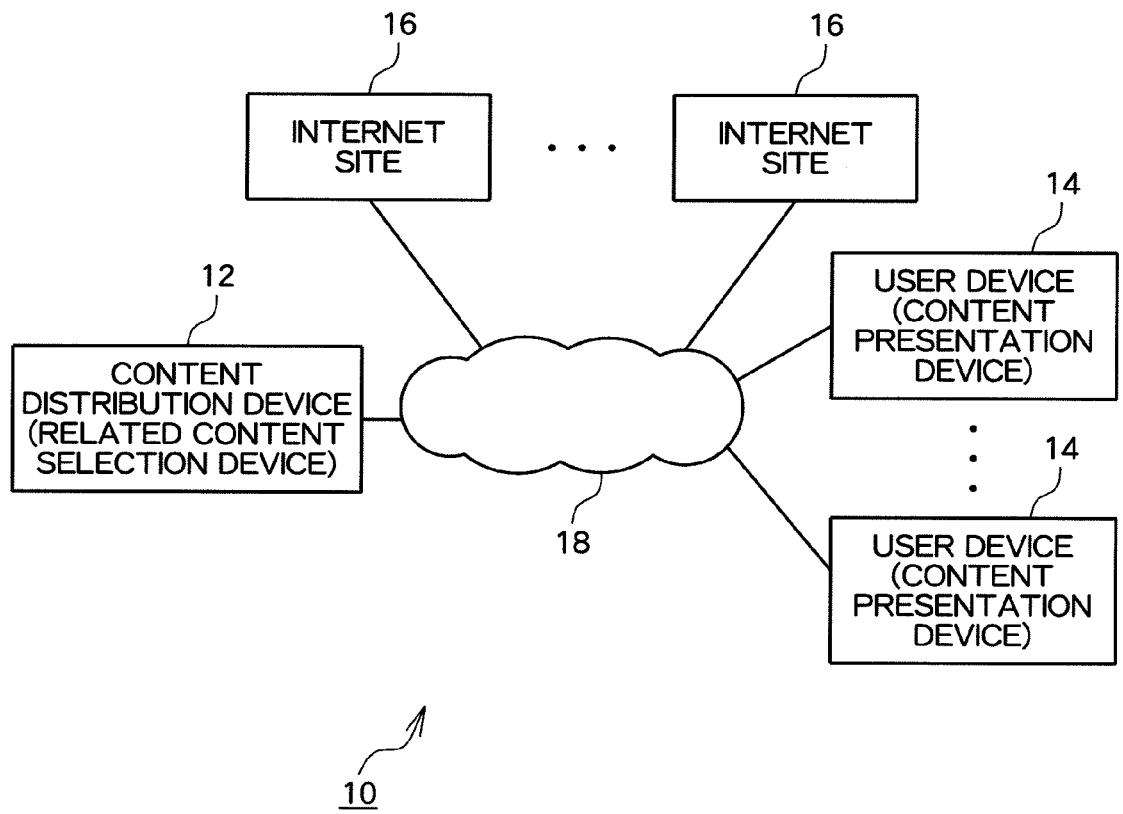
FIG. 1 is a diagram showing a complete structure of a content presentation system according to an embodiment of the present invention.

FIG. 1 is a diagram showing a complete structure of a content presentation system according to the embodiment of the present invention. As shown, the content presentation system 10 comprises a content distribution device 12, a plurality of user devices 14, and a plurality of Internet sites 16, all connected to a communication network 18, such as the Internet or the like. The content distribution device 12, the user device 14, and the Internet site 16 are formed using publicly known computers. The Internet site 16 stores document data, such as web pages, blogs, and so forth, and sends the stored document data when accessed from the outside. Document data about web pages and/or blogs are desirably updated by the administrators of the respective Internet sites 16. The user device 14 accesses the content distribution device 12 via the communication network 18, and receives data of desired content therefrom. In the above, the content distribution device 12 selectively distributes either one of the two kinds of presentation data in response to the user's switching instruction, and the user device 14 (the content presentation device) having received the distributed data produces display data for displaying a presentation screen exhibiting the relationship among the contents, and displays on the display. With the above, the user can find their desired content by looking at the presentation screens exhibiting the content relationships according to different criteria.

FIGS. 2 to 8 show presentation screens to be shown on the display of the user device 14. Two kinds of presentation screens are prepared for selective display, including one related to a spatial view (a spatial view presentation screen) and the other related to an associative view (an associative view presentation screen).

The spatial view presentation screen is a screen showing a picture obtained by viewing a virtual three dimensional space where content objects representative of respective contents are placed, from a viewpoint defined therein in a predetermined viewing direction. FIGS. 2 to 5 and FIG. 8 show the examples of a spatial view presentation screen. The positions of the respective contents in the virtual three dimensional space are calculated based on the characteristic vectors representative of the characteristics of the contents. The more strongly contents relate each other, the closer the contents are placed in the virtual three dimensional space, while the more weakly the contents relate each other, the further apart the contents are placed from each other.

The display data of a spatial view presentation screen is produced in the user device 14 based on space data, block data (see FIGS. 12(*a*) and 12(*c*)), and so forth, or presentation data for a spatial view which contains position coordinates corresponding to the contents in the virtual three dimensional space. The user device 14 shows a spatial view presentation screen on the display based on the display data. It should be noted that the viewpoint and the viewing direction defined in the virtual three dimensional space are freely changeable through a view changing operation carried out using an input device of the user device 14. The above-described arrangement makes it possible to look over the entire virtual three dimensional space.

Figure 6:
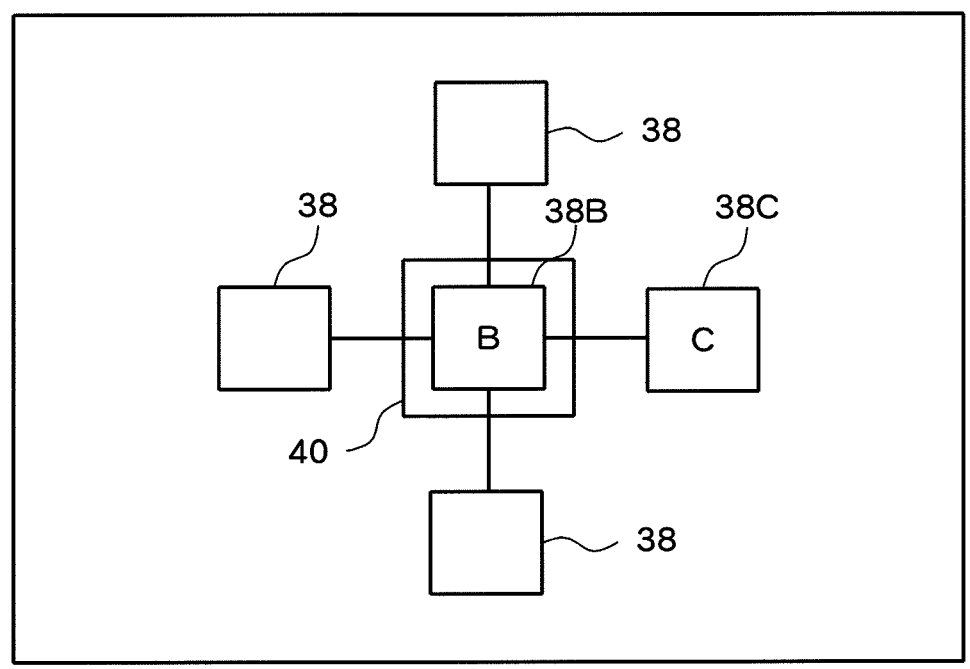
FIG. 6 is a diagram showing a spatial view presentation screen.
Figure 7:
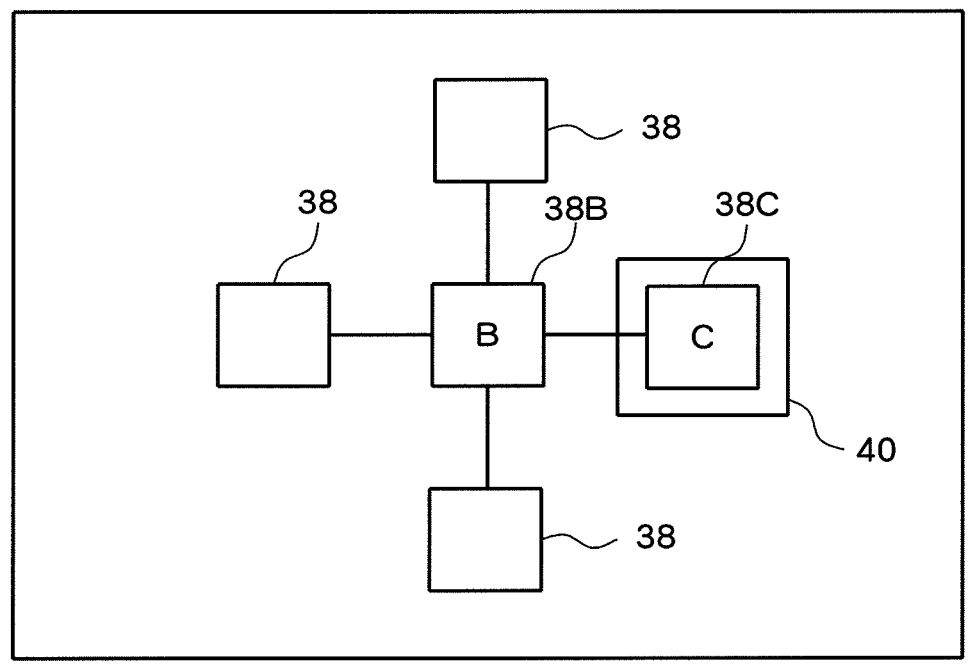
FIG. 7 is a diagram showing a spatial view presentation screen.

Meanwhile, an associative view presentation screen is a screen showing icon images representative of the content designated by the user the contents that either directly or indirectly relate to the designated content, and lines added according to the content relationship to connect the respective icon images. FIGS. 6 and 7 show the examples of an associative view presentation screen. The display data about an associative view presentation screen is produced in the user device 14 based on a CC table (see FIG. 12(*d*)), or presentation data for an associative view, which describes content and related content thereof. The user device 14 shows an associative view presentation screen on the display based on the display data.

In this embodiment, a character string contained in content metadata and a character string contained in a document in an Internet site are analyzed to evaluate the relevance (similarity) between the character strings, and an SS table (to be described later) which describes a character string and other character string related thereto is produced. Content is made directly related to a character string based on the content metadata, and contents are made related to each other based on the SS table and character strings directly related to the respective contents. The relevance among the contents is exhibited on the associative view presentation screen. With the above, the user can know, by looking at the associative view presentation screen, the relevance among the contents according to a criterion other than the one employed for a spatial view.

Figure 2:
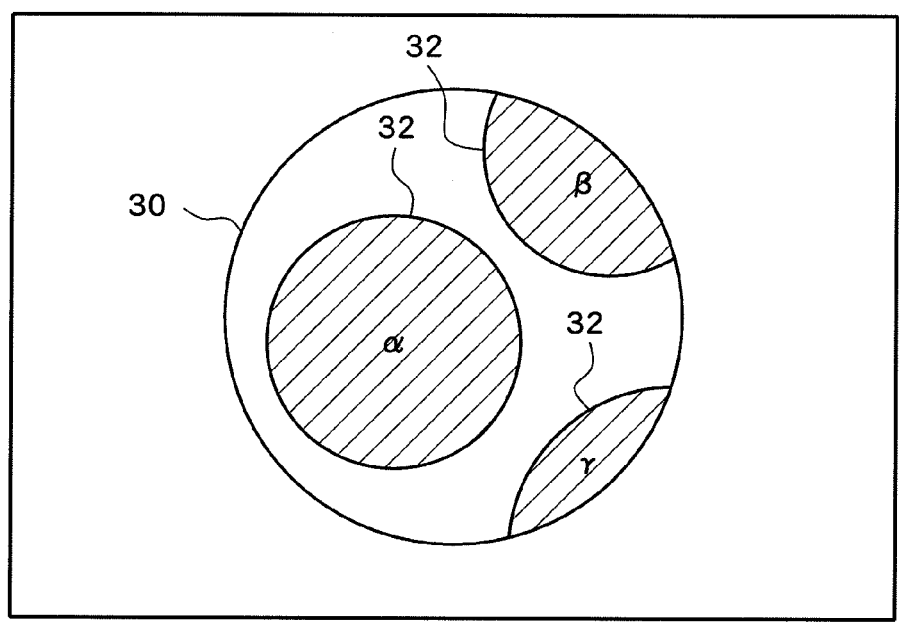
FIG. 2 is a diagram showing a spatial view presentation screen.
Figure 3:
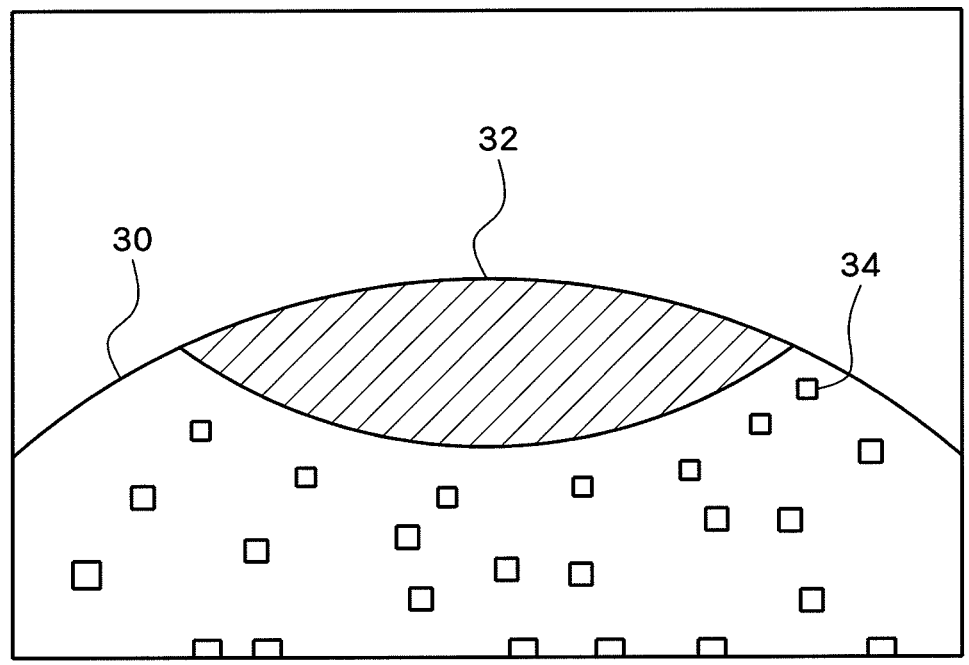
FIG. 3 is a diagram showing a spatial view presentation screen.

Here, when a spatial view presentation screen is shown in the user device 14 based on the presentation data for a spatial view sent from the content distribution device 12, the image of a spherical object 30 placed in the virtual three dimensional space, as shown in FIG. 2, is displayed. Specifically, a guide 32, or a circular area, is shown on the surface of the spherical object 30, where a content object representative of content of a specific genre is allocated. Then, when a view changing operation is carried out in the user device 14 to move the viewpoint so as to get closer to the spherical object 30 and presentation data is returned to the user device 14 in response to the view changing operation, a picture obtained by viewing the spherical object 30 from the new viewpoint closer to the spherical object 30 is displayed in the user device 14, in which many content objects are shown on the surface of the spherical object 30, as shown in FIG. 3.

Figure 4:
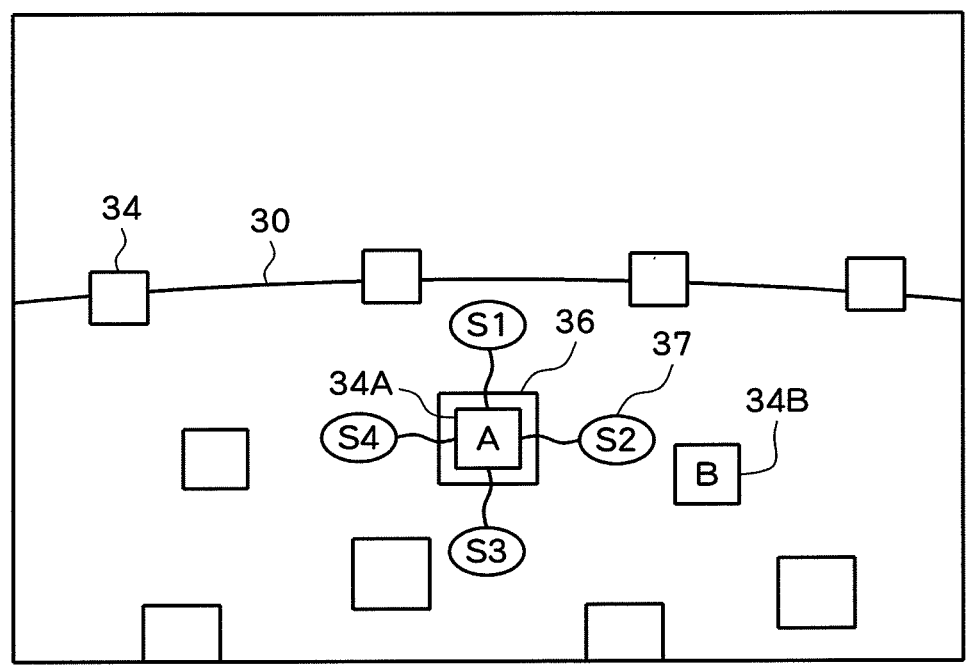
FIG. 4 is a diagram showing a spatial view presentation screen.

Thereafter, when a view changing operation is once again carried out to move the viewpoint much closer to the spherical object 30 in the user device 14, many content objects placed on the surface of the spherical object 30 are shown in an enlarged size on the display of the user device 14, as shown in FIG. 4. Further, a cursor 36 appears in the position of any content object 34 to thereby distinctively display the content object 34. Also, a character string 37 related to the content represented by the distinctively displayed content object 34 by the cursor 36 is additionally shown around the content object 34.

When a cursor moving operation is thereafter carried out using the input device of the user device 14, the cursor 36 moves to another content object 34 to thereby distinctively display that content object 34. That is, the cursor 36 is displayed at the position of the content object 34A on the presentation screen shown in FIG. 4, while the cursor 36 is displayed at the position of the content object 34B on the presentation screen shown in FIG. 5. When a reproduction instruction operation is carried out using the input device of the user device 14 while the cursor 36 is shown at the position of any content object 34, it is possible to download and reproduce the content data, such as music, movies, and so forth, corresponding to that content object 34.

Figure 5:
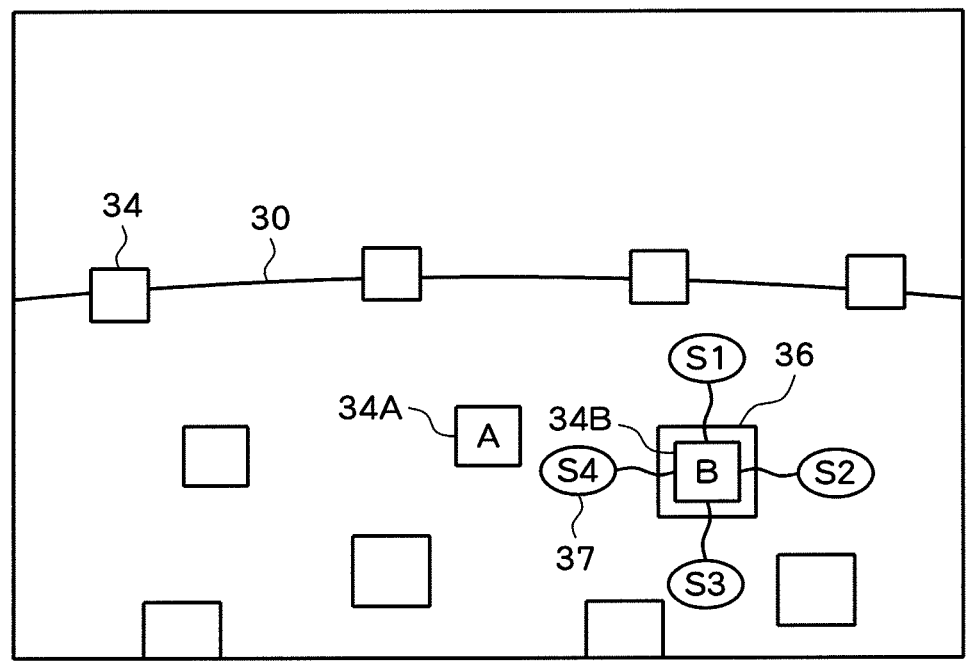
FIG. 5 is a diagram showing a spatial view presentation screen.

For example, when a view switching operation is carried out using the input device of the user device 14 while the cursor 36 is shown at the position of the content object 34B, as shown in FIG. 5, presentation data for an associative view is downloaded from the content distribution device 12. Then, an associative view presentation screen where an icon image 38B representative of the content corresponding to the content object 34B is shown at the center of the screen, surrounded by four icon images 38, including an icon image 38C, or the like, representative of the contents related to the content shown at the center of the screen, as shown in FIG. 6, is displayed in the user device 14 based on the downloaded presentation data. On this presentation screen, specifically, the icon image 38 representative of the content which is described as related to the content B in the CC table corresponding to the content (defined as content B) corresponding to the content object 34B is shown around the icon image 38B representative of the content B, and a cursor 40 is displayed in the position of one of the icon images (the icon image 38B in the example shown in FIG. 6) to thereby distinctively display that icon image.

Similar to the cursor 36, the cursor 40 moves to another icon image 38 in response to a cursor moving operation carried out using the input device of the user device 14 to thereby distinctively display the other icon image 38. That is, the cursor 40 is located at the position of the icon image 38B on the presentation screen shown in FIG. 6, while the cursor 40 is located at the position of the icon image 38C on the presentation screen shown in FIG. 7. When a reproduction instruction operation is carried out using the input device of the user device 14 while the cursor 40 is displayed in the position of any content object 38, it is possible to download and reproduce the data of content, such as music, movies, and so forth, corresponding to that content object 38.

Figure 8:
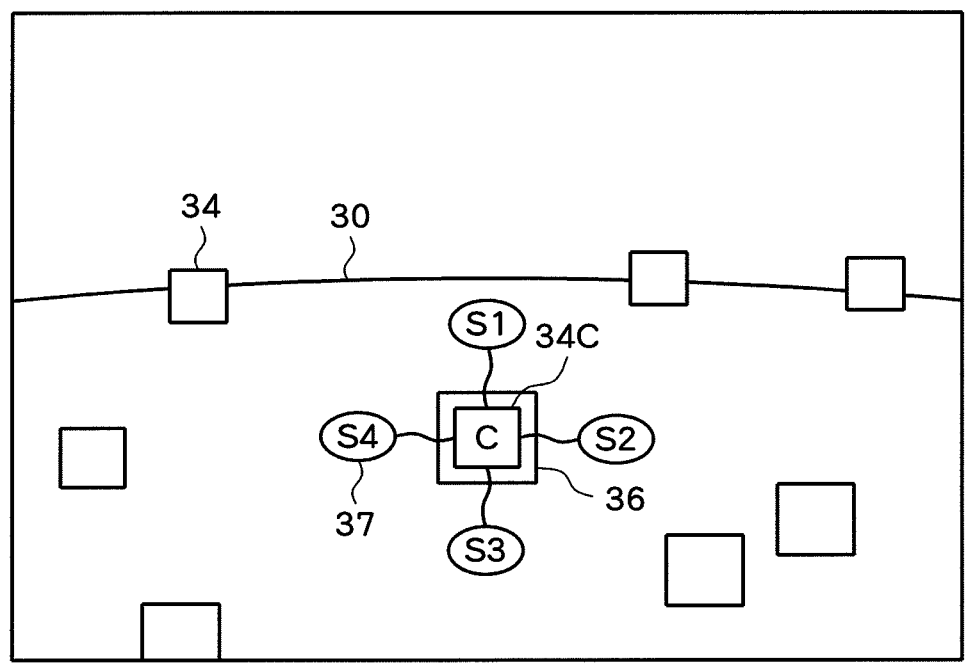
FIG. 8 is a diagram showing an associative view presentation screen.

Here, when a view switching operation is carried out using the input device of the user device 14 while the cursor 40 is displayed in the position of the content object 38C, for example, as shown in FIG. 7, a spatial view presentation screen is accordingly shown on the display of the user device 14. The shown presentation screen exhibits a picture obtained by viewing the virtual three dimensional space from the viewpoint in the viewing direction which are adjusted such that the content object 34C representative of the content corresponding to the icon image 38C is located at the center of the screen, as shown in FIG. 8. That is, the content object 34C representative of the content corresponding to the icon image 38C is displayed at the center of the screen.

That is, according to the content presentation system 10, when the content object 34 of any content is specified by the cursor 36 and a view switching operation is thereafter carried out while the spatial view presentation screen is shown, it is possible to display an associative view presentation screen where the icon image 38 of that content is shown at the center thereof on the display of the user device 14. Similarly, when the content object 38 of any content is specified by the cursor 40 and a view switching operation is thereafter carried out while the associative view presentation screen is shown, it is possible to display a spatial view presentation screen where the content object 34 of that content is shown at the center thereof on the display of the user device 14. In this manner, the user can find their desired content while desirably and selectively using the associative view and the spatial view.

Figure 9:
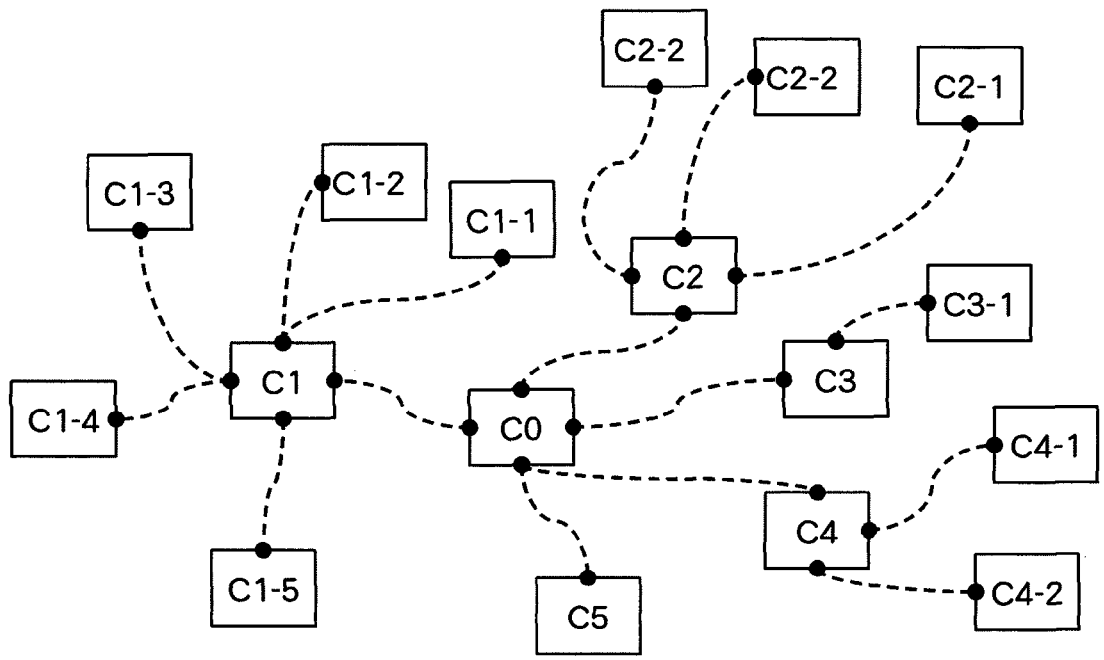
FIG. 9 is a diagram showing a modified example of an associative view presentation screen.
Figure 10:
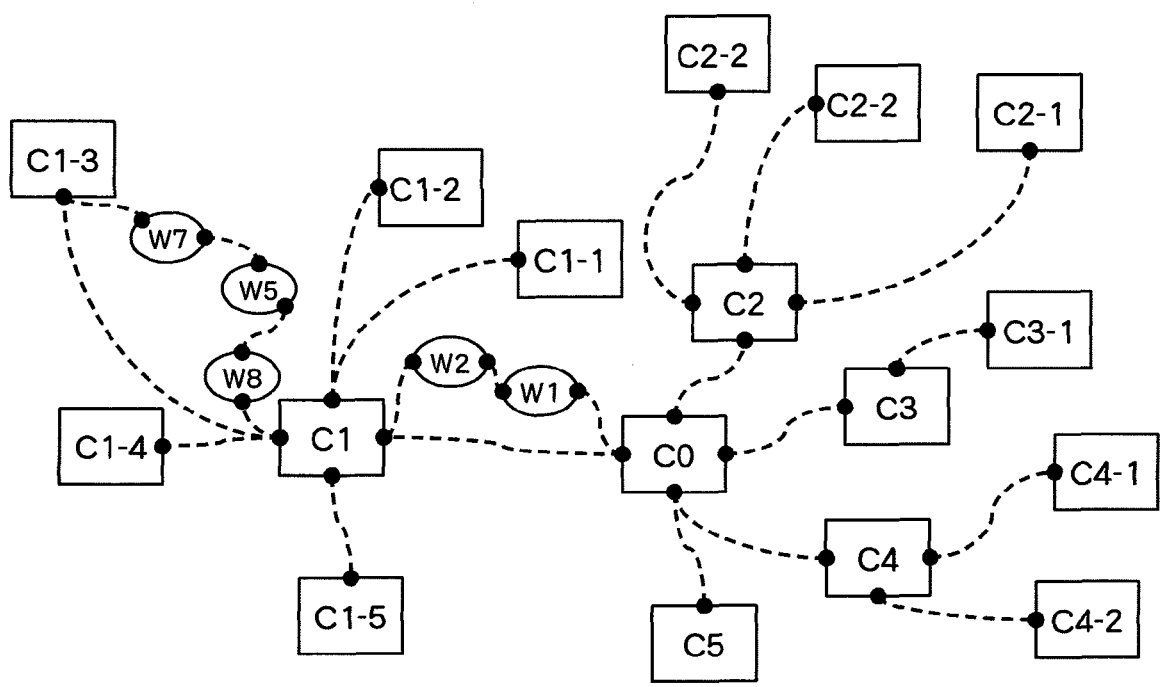
FIG. 10 is a diagram showing another modified example of an associative view presentation screen.

FIGS. 9 and 10 show modified examples of the associative view presentation screen. Specifically, while the icon images of the contents directly related to the content shown at the center of the screen are shown based on one CC table on the presentation screen shown in FIGS. 6 and 7, the icon images of the contents indirectly related to the content shown at the center of the screen are additionally shown based on a plurality of CC tables on the screen shown in FIG. 9. For example, the screen shown in FIG. 9 shows not only that the content C1 is related to the content C0 but also that the content C1 is related to the contents C1-1 to C1-5.

In this embodiment, an SS table (to be described later) is produced for each of many character strings, which describe one or more character strings related to that character string. Then, with respect to a character string directly related to certain content, a character string directly or indirectly related to that character string is specified with reference to the SS table; content related to that specified character string is searched; and the searched content is stored as related to the original content. As described above, when it is determined that content is related to other content via one or more character strings (a key word), the intervening one or more character strings may be shown on the presentation screen, as shown in FIG. 10. Specifically, it is shown in FIG. 10 that the content C0 and the content C1 are related to each other via the character strings W1 and W2, and the content C1 and the content C1-3 are related to each other via the character strings W7, W5, and W8. According to this embodiment, contents are made related to each other in an associative manner based on the relevance between the character strings, as described above. This makes it possible to present various contents to the user. It should be noted that, on the presentation screens shown in FIGS. 9 and 10, an object character may be displayed on icon images of the contents, the character string, or the line connecting the icons/character strings. The object character may be moved freely or in response to the user's operation. With the above, the user can access related content or a related character string either automatically or through a simple operation.

In the following, the content distribution device 12 and the user device 14 will be described in further detail.

Figure 11:
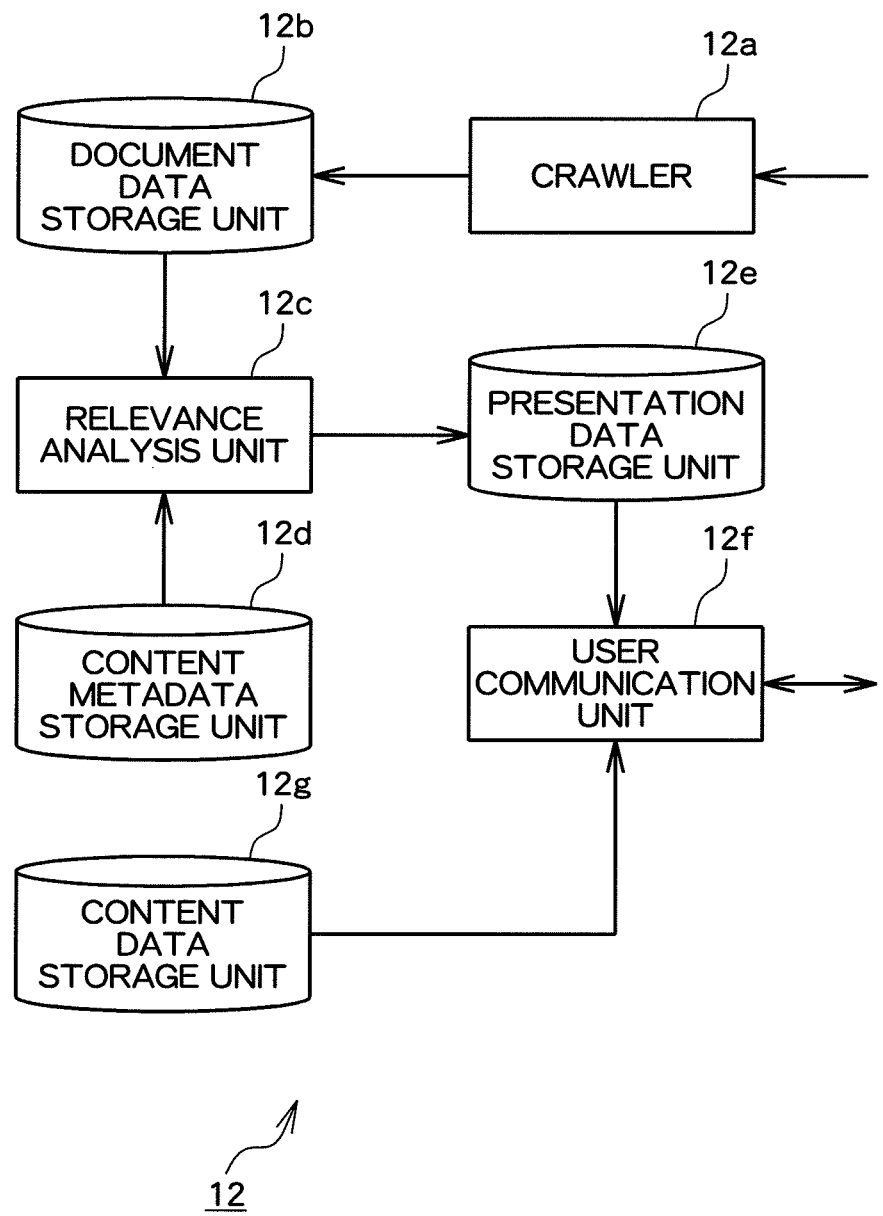
FIG. 11 is a functional block diagram of a content distribution device (a related content selection device)

FIG. 11 is a functional block diagram of the content distribution device 12 (a related content selection device). As shown in FIG. 11, the content distribution device 12 comprises, in terms of functions, a crawler 12a, a document data storage unit 12b, a relevance analysis unit 12c, a content metadata storage unit 12d, a presentation data storage unit 12e, a user communication unit 12f, and a content data storage unit 12g. These elements are realized in the content distribution device 12 formed with the computer as a major element, by executing a program according to this embodiment. This program may be installed from a computer readable information storage medium, such as a CD-ROM, a DVD-ROM, or the like, for example, into a computer used as the content distribution device 12, or alternatively downloaded via the communication network 18 to the computer from another computer.

The crawler 12a regularly accesses the Internet site 16 via the communication network 18 to receive the latest document data. The received document data is stored in the document data storage unit 12b, and the content recorded in the document data storage unit 12b is regularly updated. The document data is used as a base in calculation of the similarity (relevance) between character strings used in the content distribution device 12. The arrangement in which the document data is regularly updated enables update of the similarity between the character strings, and thus regular update of the relevance between contents.

The content data storage unit 12g stores data about a lot of contents, including movies, music, images, and so forth, to be sent to the user device 14. The content metadata storage unit 12d stores metadata of the contents stored in the content data storage unit 12g. The metadata contains, for example, the title, creator, genre name, sub-genre name of the content. The metadata may be set in advance with respect to each content.

For each content stored in the content data storage unit 12g, the relevance analysis unit 12c selects at least one content related to that content from among those stored in the content data storage unit 12g, based on the content stored in the document data storage unit 12b and the content metadata storage unit 12d. Then, a table (a CC table to be described later) which describes content and related content thereof is produced for every content, and stored in the presentation data storage unit 12e. Further, a CS table which describes content and a related character string thereof is also produced for every content, and stored in the presentation data storage unit 12e. The relevance analysis unit 12c will be described later in further detail.

The presentation data storage unit 12e is a storage means for storing presentation data (presentation data for a spatial view) serving as a base in production of display data about a spatial view presentation screen and presentation data (presentation data for an associative view) serving as a base in production of display data about an associative view presentation screen. As described above, the presentation screen shows images representative of some desired contents among a lot of contents (the image of the content object 34 and the icon image 38), and also content relationship information. In particular, the presentation data storage unit 12e stores, as presentation data for a spatial view, space data and block data describing the position at which an image representative of each content is placed in the virtual three dimensional space, as described above, and also, as presentation data for an associative view, a CC table which describes content and related content thereof.

FIG. 12 is a diagram schematically showing the content stored in the presentation data storage unit 12e. As shown in the drawing, the presentation data storage unit 12e stores space data (for a spatial view), shown in (a), guide data (for a spatial view), shown in (b), block data (for a spatial view), shown in (c), a CC table (for an associative view), shown in (d), and a CS table (for a spatial view), shown in (e).

The virtual three dimensional space is divided into sections (blocks). The space data describes the identification, position coordinates, and size (block size) of each block, and the number of contents located in the block. The block data is produced for every block, and describes, in association with the identification of each block, the identification of the content located in the block, the position coordinates of a content object 34 in the virtual three dimensional space, the title of the content, an artist name, an album name, a genre, a sub-genre, information about the location of the content data, and information about the location of a texture image to be pasted onto the content object. By managing, for every content block, the position coordinates or the like of a content object 34 located in the block, as described above, it is possible to send information about the position coordinates or the like of the content object 34 in a required range in each content block to the user device 14. Consequently, the amount of communication to be carried out between the content distribution device 12 and the user device 14 can be reduced.

The CC table, produced for every content, describes the position coordinates of content and related content thereof in the virtual three dimensional space, the title of the content, an artist name, an album name, a genre, a sub-genre, identification and content of a character string used to make contents related to each other, and information about link between contents.

The guide data describes the identification and position coordinates of each guide 32, shown in FIGS. 2 and 3, in the virtual three dimensional space, information about the location of the image shown as the guide 32, and the radius of the guide 32. The CS table describes a character string to be displayed around the content object 34 distinctively displayed by the cursor 36 in a spatial view.

Figure 13:
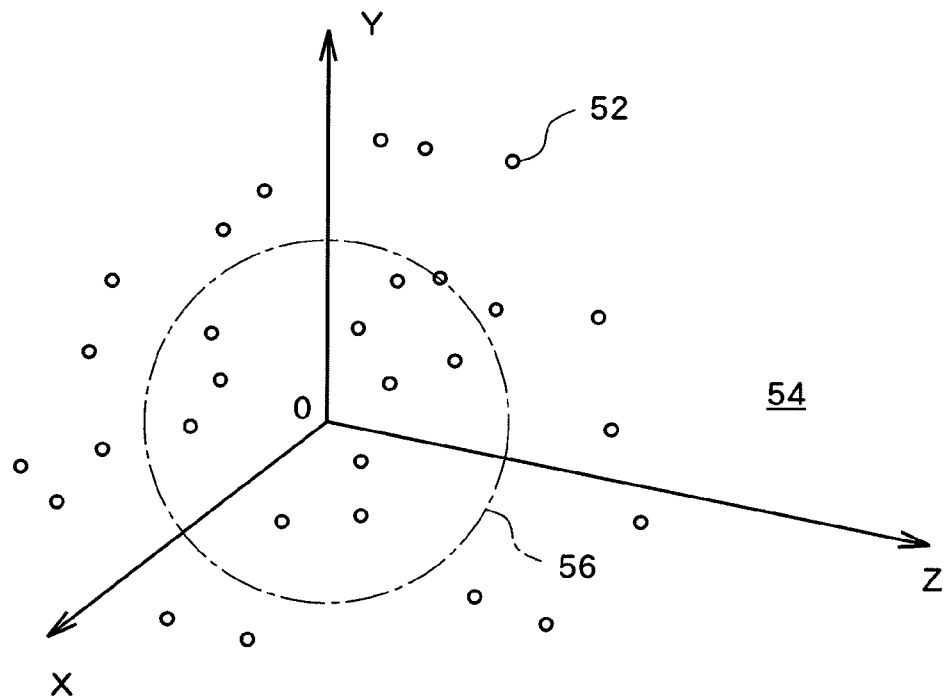
FIG. 13 is a diagram explaining a procedure for producing presentation data for use in production of a spatial view presentation screen.

Here, a method for calculating the position coordinates, described in the block data, of each content object 34 in the virtual three dimensional space will be described. As shown in FIG. 13, many content positions 52, each representative of the characteristics of each content, are defined in the virtual three dimensional space 54. For example, information about which keyword is set to each content, to which genre that content belongs, and so forth, may be obtained for every content and a characteristic vector representative of the content (that is, the characteristics of the content) may be produced, before each content position 52 is placed in the virtual three dimensional space 54 based thereon. In the above, the coordinate axes are desirably set in the virtual three dimensional space 54, using a method, such as multivariate or the like. In the virtual three dimensional space 54, the center is set on the origin; the spherical surface 56 of a sphere having a predetermined radius is defined; and each content position 52 is projected onto the spherical surface 56. That is, the position coordinates of a cross point where a straight line connecting the origin and a respective content position 52 intersects the spherical surface 56 are calculated, and the content object 34 of the content which corresponds to that content position 52 is placed in that position. A spherical object 30 is placed at the position of the spherical surface 56.

Figure 14:
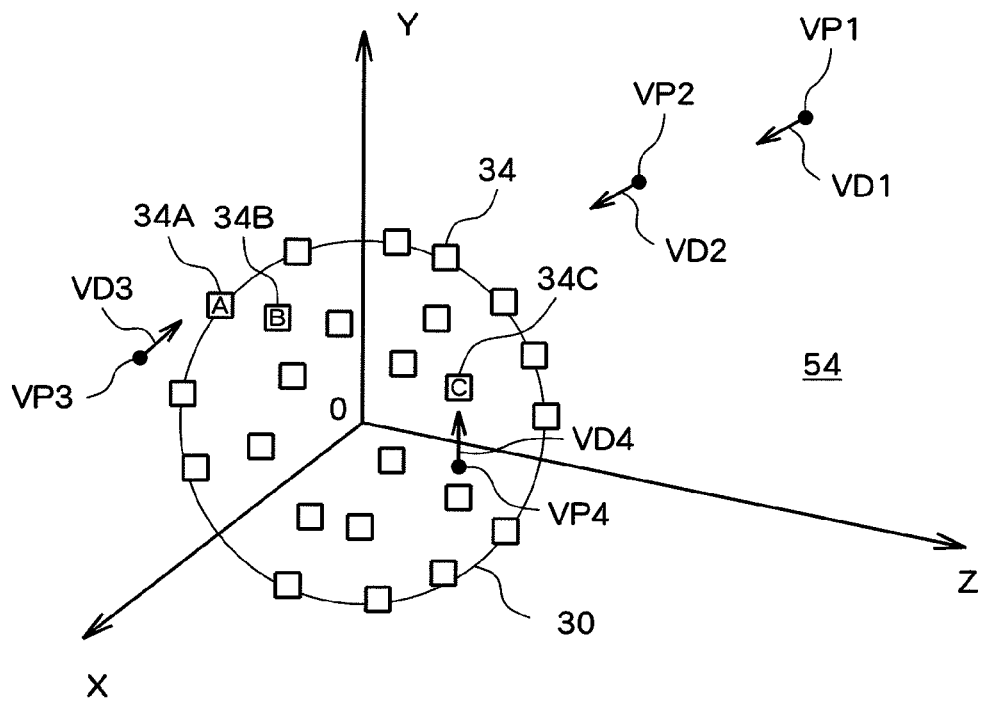
FIG. 14 is a diagram explaining a procedure for producing presentation data for use in production of a spatial view presentation screen.

FIG. 14 is a diagram showing a virtual three dimensional space 54 where the content object 34 and the spherical object 30 are placed as described above. As shown in the drawing, many content objects 34 are placed on the surface of the spherical object 30 according to the characteristics of the respective contents. Then, pictures obtained by viewing the virtual three dimensional space 54 from various viewpoints in various viewing directions, such as from the viewpoint VPn in the viewing direction VDn (n=1, 2, 3, 4), are shown as a spatial view presentation screen in the user device 14.

It should be noted that a picture obtained by viewing the virtual three dimensional space 54 from the viewpoint VP1 in the viewing direction VD1 results in the presentation screen shown in FIG. 2, and the picture obtained by viewing the virtual three dimensional space 54 from the viewpoint VP2 in the viewing direction VD2 results in the presentation screen shown in FIG. 3. The picture obtained by viewing the virtual three dimensional space 54 from the viewpoint VP3 in the viewing direction VD3 results in the presentation screens shown in FIGS. 4 and 5, and the picture obtained by viewing the virtual three dimensional space 54 from the viewpoint VP4 in the viewing direction VD4 results in the presentation screen shown in FIG. 8.

Returning to FIG. 11, the user communication unit 12f communicates, via the communication network 18, with each of the user devices 14, and specifically reads presentation data and content data from the presentation data storage unit 12f and the content data storage unit 12g, respectively, in response to a request from the user device 14, and sends to the user device 14.

That is, when the user device 14 shows a spatial view presentation screen, the user communication unit 12f sends, as presentation data, space data, guide data, and block data and a CS table in a necessary range, all stored in the presentation data storage unit 12e, to the user device 14. When either a view changing operation for changing the viewpoint and the viewing direction or a cursor moving operation for moving the cursor 36 is carried out, block data and a CS table in an accordingly different range are sent to the user device 14, which then updates the presentation screen.

When a reproduction instruction operation is carried out with any content designated by the cursor 36 while the spatial view presentation screen is shown, the user device 14 sends the identification of that content to the content distribution device 12, and the user communication unit 12f accordingly sends the content data of the content identified by that identification to the user device 14.

When the user device 14 shows an associative view presentation screen, the user communication unit 12f sends, as presentation data, a CC table stored in the presentation data storage unit 12e to the user device 14. When either a cursor moving operation for moving the cursor 40 or an operation for changing the display range is carried out, another CC table is accordingly sent to the user device 14, which then updates the presentation screen based on the newly received CC table.

When a reproduction instruction operation is carried out with any content designated by the cursor 40 while the associative view presentation screen is shown, the user device 14 sends the identification of that content to the content distribution device 12, and the user communication unit 12*f* accordingly sends the content data of the content identified by that identification to the user device 14.

Figure 15:
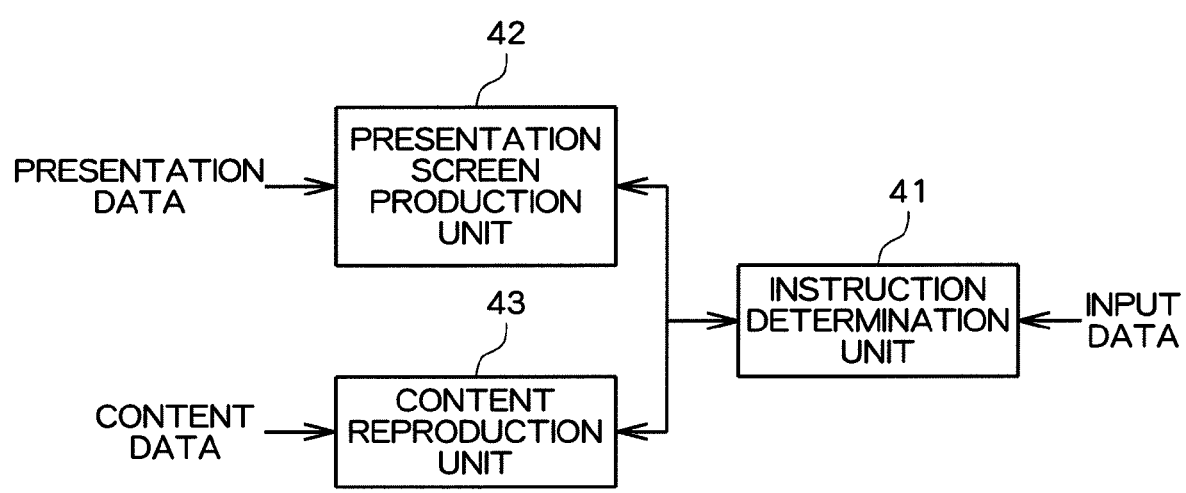
FIG. 15 is a detail functional block diagram of a user device (a content presentation device)

FIG. 15 is a functional block diagram of the user device 14. As shown in the drawing, the user device 14 comprises, in terms of function, an instruction determination unit 41, a presentation screen production unit 42, and a content reproduction unit 43. These are realized in the user device 14 formed with the computer as a major element, by executing a program according to this embodiment. This program may be installed from a computer readable information storage medium, such as, for example, a CD-ROM, a DVD-ROM, or the like, into a computer used as the user device 14, or alternatively downloaded via the communication network 18 to the computer from another computer.

The presentation screen production unit 42 produces display data about a spatial view presentation screen or an associative view presentation screen based on the presentation data for a spatial view or an associative view stored in the presentation data storage unit 12*e* of the content distribution device 12. The presentation screen is shown on the display based on the display data.

The instruction determination unit 41 determines what operation is carried out by the user, based on the input data input from the input device. That is, the instruction determination unit 41 determines which of the content reproduction instruction operation for a spatial view or an associative view, the view switching operation, the cursor moving operation, and the view changing operation in a spatial view, is carried out.

When it is determined that the content reproduction instruction operation is carried out, the presentation screen production unit 42 specifies the content designated by the cursor 36, 40, sends the identification of the content to the content reproduction unit 43, and instructs reproduction of the content. The content reproduction unit 43 sends the content identification to the content distribution device 12, and downloads the content data of the content identified by the identification. With the downloading completed, the content data is reproduced.

Meanwhile, when it is determined that the cursor moving operation is carried out, the content (a movement direction and so forth) of the operation is informed to the presentation screen production unit 42, which then moves the position in which to display the cursor 36 on the spatial view presentation screen or moves the cursor 40 on the associative view presentation screen. Also, when it is determined that the view changing operation is carried out with respect to the spatial view presentation screen, the content of the operation is informed to the presentation screen production unit 42, which then changes the viewpoint and the viewing direction according to the content of the view changing operation.

Further, the instruction determination unit 41 determines whether the view switching operation (for example, pressing the button or the like) is carried out using an input device after any content is designated by the cursor 36, 40 in a space/associative view. When it is determined that such a view switching operation is carried out, the presentation screen production unit 42 is notified to that effect. Specifically, the presentation screen production unit 42 receives presentation data for a view of the type different from that of the current view from the content distribution device 12, produces display data about a presentation screen based on the presentation data, and shows the presentation screen on the display. That is, when the view switching operation is carried out with the spatial view presentation screen on display, the presentation data for an associative view is received, and the associative view presentation screen is displayed based thereon. In the above, the presentation data (a CC table) according to the content which is designated by the cursor 36 in carrying out the view switching operation is received, and a presentation screen where the icon image 38 representative of the designated content is shown at the center of the screen and surrounded by the icon image 38 representative of the content related to the designated content is displayed based on the data.

When the view switching operation is carried out while the associative view presentation screen is displayed, the presentation data for a spatial view is received, and the spatial view presentation screen is displayed based thereon. Also in the above, identification of the content which is designated by the cursor 40 in carrying out the view switching operation is obtained, and a viewpoint and a viewing direction which are determined such that the content object 34 of the designated content is contained in the field of view range are obtained. For example, the identification of the designated content is sent to the content distribution device 12, which in turn determines the position of the content object 34 of the designated content in the virtual three dimensional space 54, and sends the position to the user device 14. This arrangement makes it possible to determine a viewpoint and a viewing direction on the user devise side 14 such that the position is contained in the field of view range. Alternatively, the content distribution device 12 having received the designation identification of the content may determine the position of the content object 34 of the designated content in the virtual three dimensional space 54, determine a viewpoint and a viewing direction such that the position is contained in the field of view range, and send the view point and viewing direction to the user device 14. Thereafter, the presentation screen production unit 42 receives presentation data for a spatial view corresponding to the obtained viewpoint and viewing direction, from the content distribution device 12, and produces an image representative of a picture obtained by viewing from the obtained viewpoint in the obtained viewing direction, as display data about a presentation screen to be shown immediately after the view switching.

The above described structure enables the user to designate their desired content by moving the cursor 36, 40 and carrying out a view switching operation. Consequently, the user can know the content related to the designated content by looking at the presentation screens for a spatial view and an associative view. This enables the user to readily find their desired content.

It should be noted that calculation of the viewpoint and the viewing direction to be used immediately after the switching to a spatial view may be carried out such that the position in which the content object 34 representative of at least one content other than the designated content among the contents represented by the icon images 38 shown on the associative view presentation screen before the switching is contained in the field of view range. For example, when a viewpoint and a viewing direction are calculated such that the largest possible portion of the position at which the content object 34 corresponding to the icon image 38 is placed is contained in the field of view range, the user can know, even for any contents other than the designated content, the relationship with other contents in the view shown after the switching. This improves the user convenience.

Figure 16:
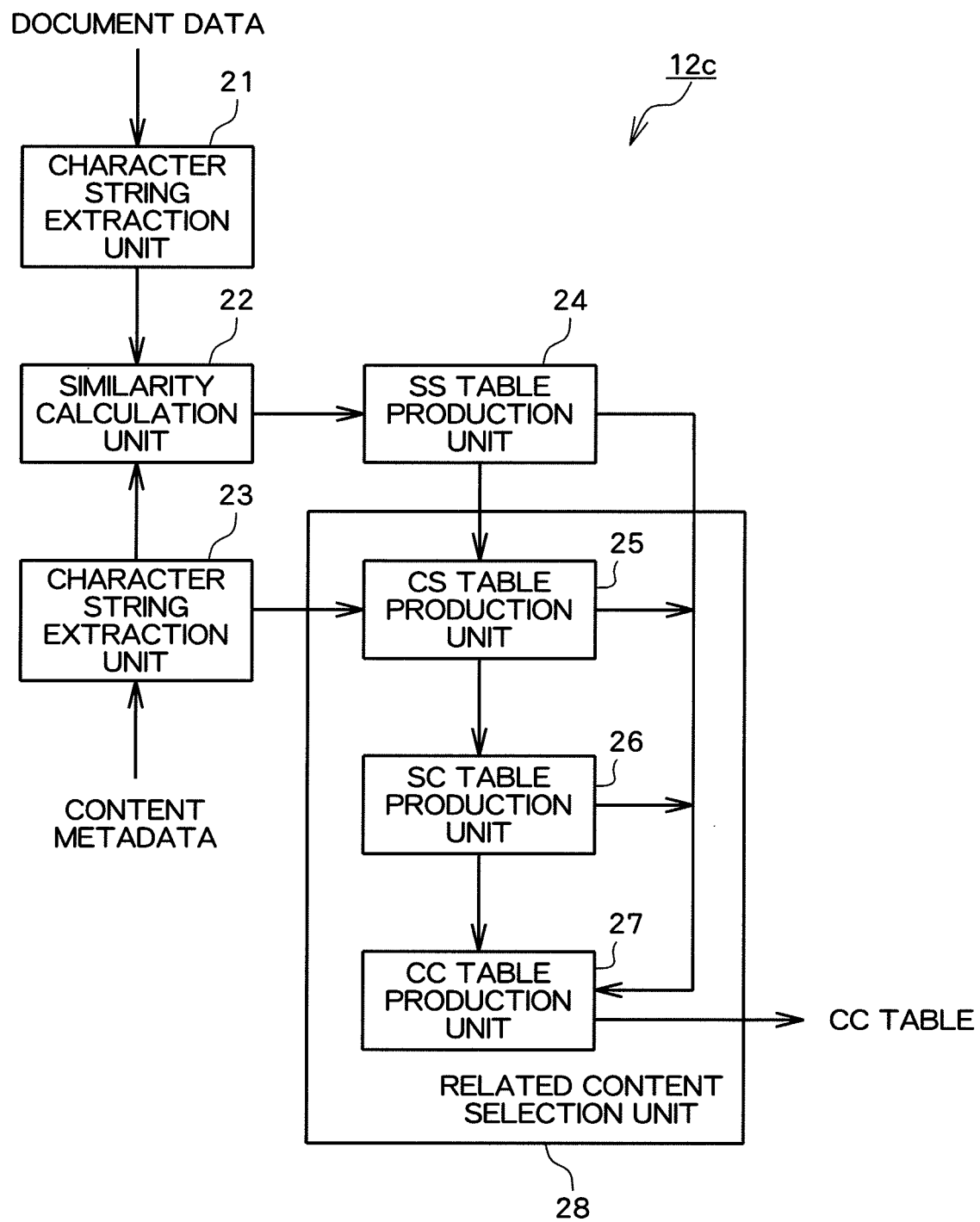
FIG. 16 is a detail functional block diagram of a relevance analysis unit.

In the following, a process to be carried out by the relevance analysis unit 12c will be described in detail. FIG. 16 is a detailed functional block diagram of the relevance analysis unit 12c. As shown in the drawing, the relevance analysis unit 12c comprises character string extraction units 21, 23, a similarity calculation unit 22, an SS table production unit 24, and a related content selection unit 28. The related content selection unit 28 comprises a CS table production unit 25, an SC table production unit 26, and a CC table production unit 27.

The character string extraction unit 21 reads document data from the document data storage unit 12b and extracts character strings from the document data. The character string extraction unit 21 calculates a term frequency of each character string, and outputs the calculated term frequency for every original document data. For example, a document described by the document data is divided into words by means of publicly known morpheme analysis to extract a specific word class, such as a noun or the like. In the above, for a predetermined character string, such as a document title, for example, a value obtained by multiplying the original value by a weight coefficient larger than one may be used as a term frequency TF so that the analyzed result is largely affected. FIG. 17(*a*) shows document data d1 to dN read from the document data storage unit 12b; FIG. 17(*b*) shows a character string directly related to a document (or, a document directly related character string data) produced based on the n-th document data dn and output from the character string extraction unit 21. As shown in the drawing, the character string extraction unit 21 outputs, for every document data, a part of the character strings contained in a document described by that document data and document directly related character string data which contains a term frequency at which each character string occurs in the document. The document directly related character string data describes a character string directly related to each document.

The character string extraction unit 23 extracts a character string from the metadata of the content stored in the content metadata storage unit 12d. With the above, one or more character strings related to each content is obtained.

Content being music albums, for example, contains metadata including an artist name, an album name, the name of a recorded music piece, a genre name, a sub-genre name, and so forth, and a character string is extracted from the metadata. In the above, desirably, the whole artist name and album name may be extracted as one character string without dividing into word classes. The character string extraction unit 23 calculates and outputs a term frequency (TF) at which each character string occurs in the metadata. The term frequency may be adjusted, depending on the content of the data from which the concerned character string is extracted. The adjustment may be made by, for example, for a character string extracted from an artist name, multiplying the original value by a weight coefficient larger than one, and, for a character string extracted from the name of a recorded music piece and so forth, multiplying the original value by a weight coefficient smaller than one. FIG. 18(*a*) shows metadata C1 to CM read from the content metadata storage unit 12d; FIG. 18(*b*) shows character string data directly related to the content (or, content directly related character string data) produced based on the m-th metadata Cm and output from the document extraction unit 23. As shown in the drawing, the character string extraction unit 23 outputs, for every metadata, the character strings contained in the metadata and content directly related character string data which contains a term frequency at which that character string occurs in the metadata. The content directly related character string data describes a character string which is directly related to that content.

Based on the document directly related character string data and the content directly related character string data, respectively output from the character string extraction units 21, 23, the similarity calculation unit 22 calculates the similarity between the character strings contained in the data. Specifically, the union of a character string contained in the document directly related character string data and a character string contained in the content directly related character string data is obtained, and a characteristic vector VSi of each character string Si belonging to that union is defined by the following expression (1), wherein "i" specifies an element of the union, being a number equal to or larger than one and equal to or smaller than β, β representing the number of elements of the union of the character strings. TFi (j) represents a term frequency (a corrected value output from the character string extraction units 21, 23) at which the i-th character string occurs in the j-th document data or metadata, wherein j is a number equal to or larger than one and equal to or smaller than α, specifying the document data stored in the document data storage unit 12b and metadata stored in the content metadata storage unit 12d, α indicating the total number of document data and content metadata, becoming the number of dimensions of the characteristic vector VSi. IDFi is an IDF (Inverse Document Frequency) value of the i-th character string, and defined by the following expression (2), wherein n is the total number of document data and content metadata, and ni is the number of data which contains the i-th character string. The similarity calculation unit 22 calculates a cosine distance between the characteristic vector VSi and the characteristic vector VSj, using the following expression (3), and outputs as the similarity Rij between the character string Si and the character string Sj. It should be note that although the cosine distance between the characteristic vector VSi and the characteristic vector VSj is determined as similarity Rij here, obviously, any other distance such as a Euclidean distance or the like may be defined as the similarity Rij.

[Expression]

$$VS_i = (TF_i^{(1)} \times IDF_i, TF_i^{(2)} \times IDF_i, \ldots, TF_i^{(\alpha)} \times IDF_i) \qquad (1)$$

$$IDF_i = \log\left(\frac{n}{n_i}\right) \qquad (2)$$

$$R_{ij} = \frac{VS_i \cdot VS_j}{|VS_i||VS_j|} \qquad (3)$$

Figure 19:
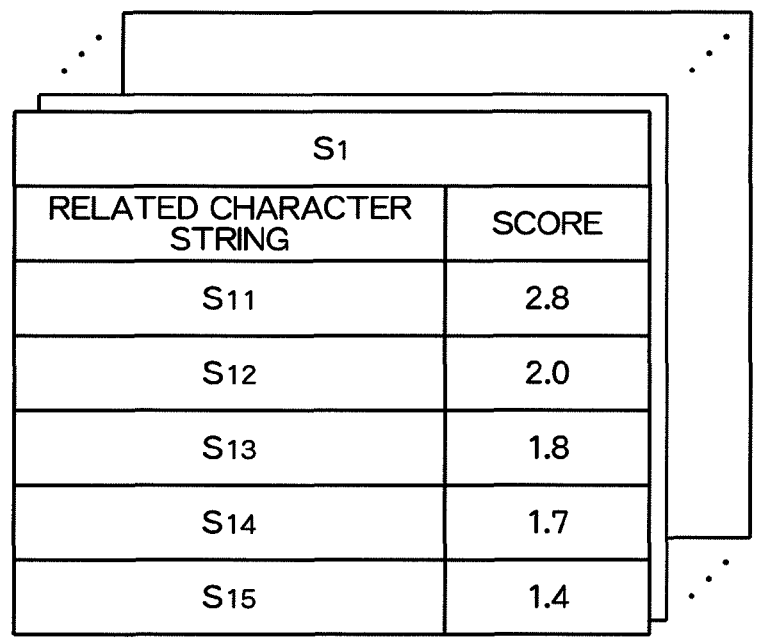
FIG. 19 is a diagram schematically showing an SS table.

The SS table production unit 24 produces an SS table based on the similarity Rii output from the similarity calculation unit 22, and stores the produced SS table. The SS table is a table which describes at least one (selected from the character strings S to Sβ excluding the character string Si) character string related to a character string Si (i=1 to β). Specifically, the SS table of the character string Si selects a predetermined number (five here) of similarities Rii from among the similarities Rij (j=1 to β; j≠i) output from the similarity calculation unit 22, beginning with the one having the largest value, and selects the character strings Sj corresponding to the similarities Rij as character strings related to the character string Si. The value of the similarity Rij for each selected character string is additionally shown as a score in the SS table. FIG. 19 shows one example of the SS table. As shown in the drawing, the SS table is produced for each of the character strings S1 to Sβ, and contains a character string Sj related to the character string Si selected as described above, and the score of the character string Sj. The score represents the similarity Rij between the character string Si and the character string Sj related thereto.

Thereafter, the related content selection unit 28 selects at least one content related to each content according to a directly related character string of the content obtained by the character string extraction unit 23 and the SS table stored in the SS table production unit 24, and output as a CC table. The related content selection unit 28 additionally outputs the CS table, produced in the process of producing the CC table. These tables are stored in the presentation data storage unit 12*e*.

Figure 20:
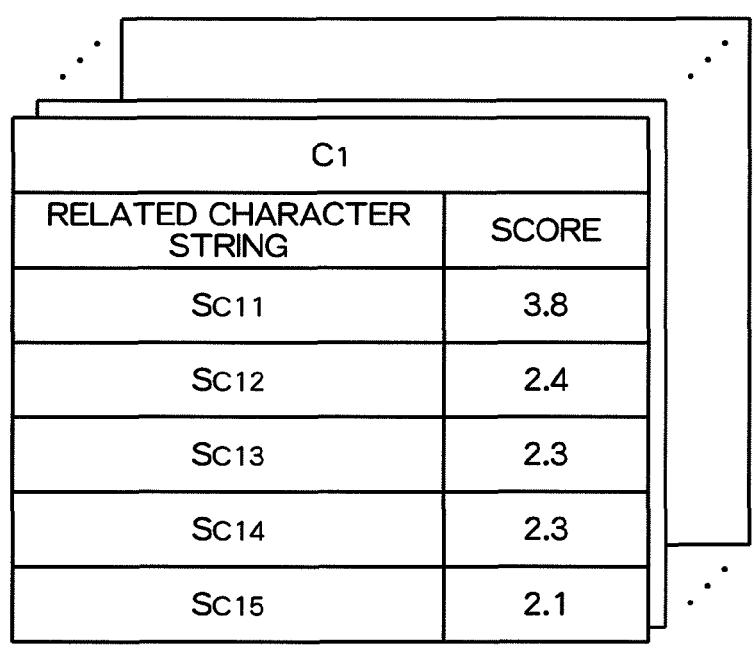
FIG. 20 is a diagram schematically showing a CS table.

As described above, the related content selection unit 28 comprises the CS table production unit 25, the SC table production unit 26, and the CC table production unit 27. The CS table production unit 25 produces a CS table based on the SS table stored in the SS table production unit 24 and the content directly related character string data extracted by the character string extraction unit 23, and stores the produced CS table. The CS table is a table which describes a character string indirectly similar to content having metadata thereof stored in the content metadata storage unit 12*d*, together with the score thereof, as shown in FIG. 20.

FIG. 21 is a flowchart of a process to produce a CS table concerning content, carried out by the CS table production unit 25. The process shown in FIG. 21 is carried out with respect to all contents, so that CS tables concerning the respective contents are produced. As shown in the drawing, the CS table production unit 25 initially obtains, from the content directly related character string data (see FIG. 18(*b*)), a character string directly related to the target content (a directly related character string) and a term frequency TF of the content (S101). Thereafter, with reference to the SS table stored in the SS table production unit 24, a character string related to each directly related character string obtained at S101 is read together with the score thereof (S102). Then, a score indicative of the strength of the relevance between the target content and the read character string, or indirectly related character sting of the target content, is calculated. For example, it may be arranged such that a higher term frequency TF obtained at S101 results in a higher score of the indirectly related character string selected as related thereto. Also, it may be arranged such that a higher score obtained at S102 results in a higher score of the indirectly related character string obtained at S102. The above described process at S101 to S103 is carried out with respect to all directly related character strings (S104, S105), and a predetermined number (five here) of character strings are output, beginning with the one having the highest score calculated at S103, as character strings indirectly related to the target content in the form of a CS table, together with the scores calculated at S103. It should be noted that the CS table production unit 25 converts the thus produced and stored CS table into the format shown in FIG. 12(*e*), and stores in the presentation data storage unit 12*e*.

The SC table production unit 26 produces an SC table based on the CS table produced by the CS table production unit 25 and stored, and stores the produced SC table. The SC table is a table which describes, for each character sting, one or more contents related to that character string, together with the score thereof, as shown in FIG. 12.

Figure 23:
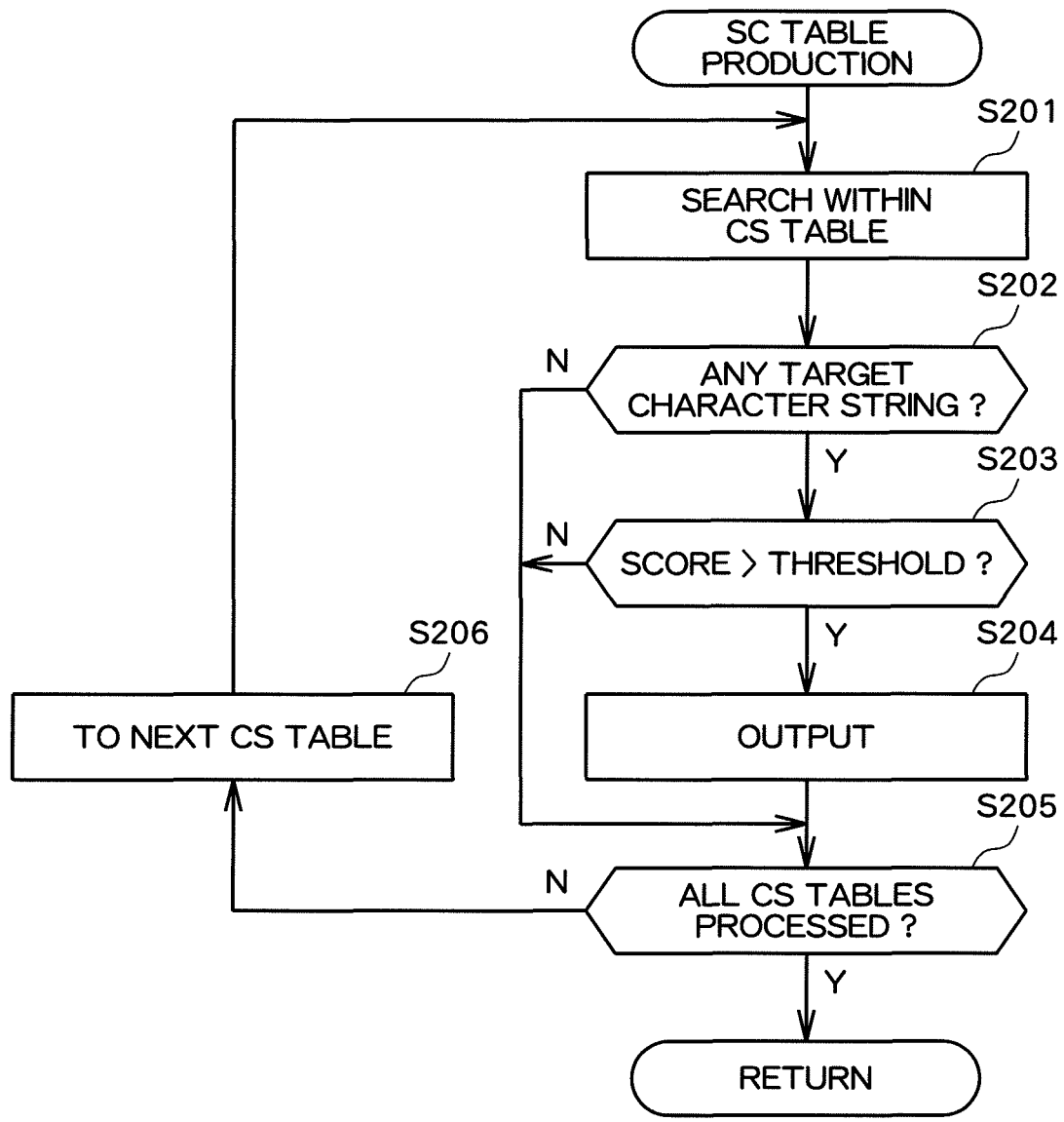
FIG. 23 is a flowchart showing an SC table production process.

FIG. 23 is a flowchart of a process to be carried out by the SC table production unit 26 to produce an SC table related to a target character string. The process shown in FIG. 23 is carried out with respect to all character strings Si, so that SC tables related to the respective character strings Si are produced. As shown in the drawing, initially, the SC table production unit 26 retrieves one of the CS tables stored in the CS table production unit 25 (S201), and determines whether or not the target character string is contained in the retrieved CS table (S202). When it is determined that the character string is contained in the CS table, it is then determined whether the score described in association with the target character string is larger than a predetermined threshold (S203). When it is determined that the score is larger than the threshold, identification of the content corresponding to the CS table is written into the SC table concerning the target character string (S204). Meanwhile, when it is determined that the target character string is not contained in the CS table or the score is equal to or smaller than the threshold, the process at S203 and S204 is skipped. Then, the process from S201 to S204 is carried out with respect to all CS tables (S205, S206). With the above process, in this embodiment, when a character string having a score larger than a predetermined threshold is contained in the CS table, the content related to the CS table is described in the SC table as content related to that character string.

Returning to FIG. 16, the CC table production unit 27 produces a CC table based on the SS table stored in the SS table production unit 24, the CS table stored in the CS table production unit 25, and the SC table stored in the SC table production unit 26, and stores the produced CC table in the presentation data storage unit 12*e*. The CC table is a table which describes, for each content, content indirectly related to that content, as shown in FIG. 12(*d*).

Figure 24:
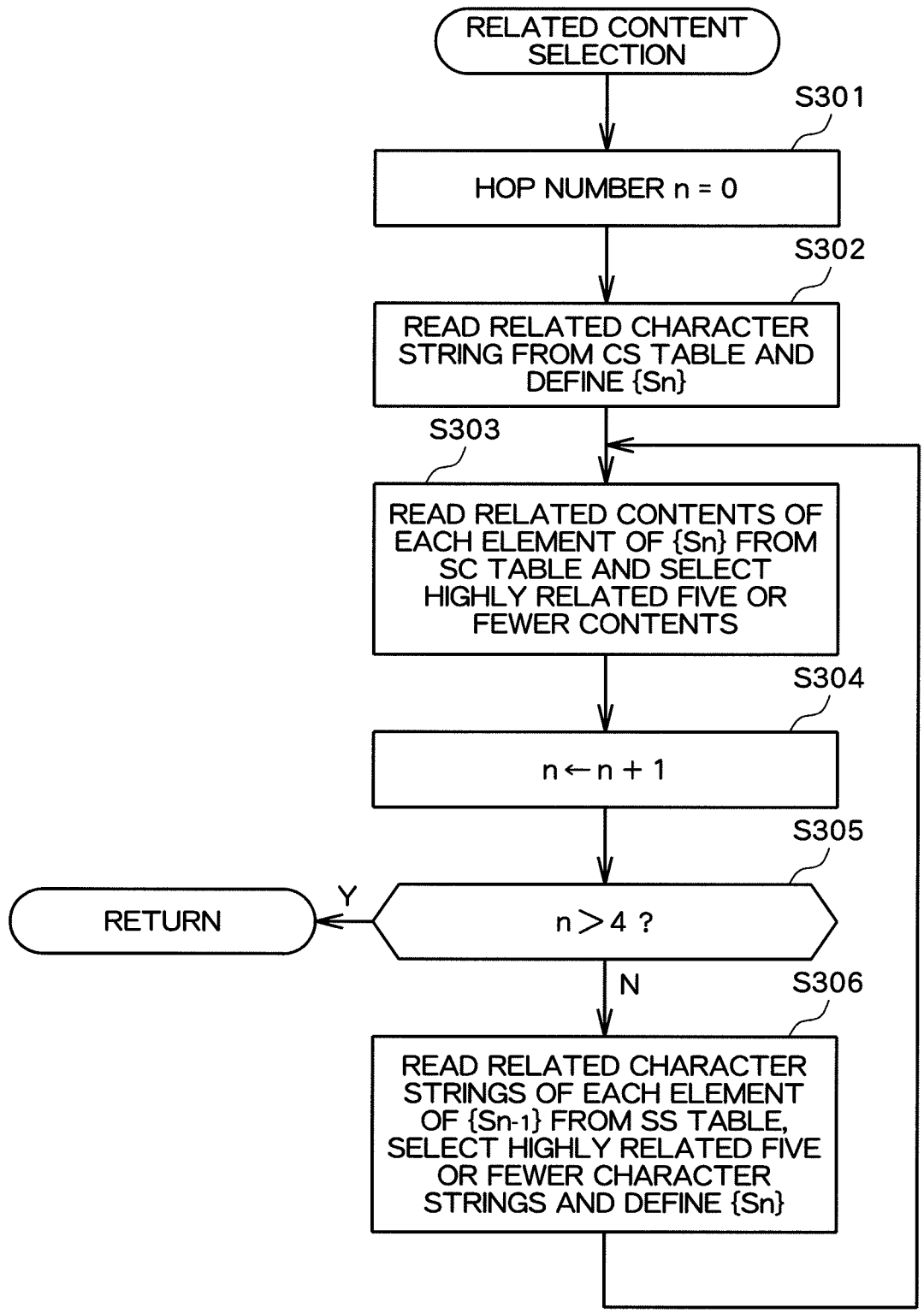
FIG. 24 is a flowchart showing a related content selection process.

FIG. 24 is a flowchart of a process carried out by the CC table production unit 27 to select related content of certain content. The process as shown in FIG. 24 is carried out with respect to all contents, and CC tables concerning the respective contents are produced based on the result of the process. As shown in the drawing, in this process, a hop number n, or the frequency at which the SS table is used before reaching the related content of the target content is initialized to zero (S301). Then, character strings corresponding to the target content are read from the CS table corresponding to the target content among those stored in the CS table production unit 25, and defined as a set {Sn} (S302). Then, the related contents of the character strings, or elements of the set {Sn}, are read from the SC tables corresponding to the character strings stored in the SC table production unit 26, and a predetermined number (five here) of contents are selected as related contents of the target content, beginning with the one having the highest score (S303).

Thereafter, the hop number n is incremented by one (S304), and until the n exceeds four (S305), character stings related to the character strings, or elements of the set {Sn−1}, are read from the SS tables corresponding to the character strings stored in the SS table production unit 24, and a predetermined number (five here) of character strings are selected, beginning with the one having the highest score, and defined as a set {Sn} (S306). Then, the process at S303 and thereafter is repeated. The process at S303 to S306 is repeated until n becomes five, and the process is terminated with n becoming five.

The CC table production unit 27 produces a CC table in the format shown in FIG. 12(*e*) for every content based on the thus selected content and the character string used in the selection, and stores in the presentation data storage unit 12*e*.

According to this embodiment, the user carries out a view switching operation to thereby selectively display either a spatial view presentation screen or an associative view on the display. In the above, at the center of the presentation screen to be displayed immediately after the switching, the icon image 38 and the content object 34 of the content which is designated when making the view switching operation are shown. Therefore, the user can know, by switching the views, the related content of any content, selected according to different criteria. This makes it possible for the user to efficiently find their desired content.

Also, according to this embodiment, the user communication unit 12*f* can instantly designate the related content of the content designated by the user, based on the CC table stored in the presentation data storage unit 12*e*, and also related content of the related content based on the CC table. In this manner, indirectly related contents of the designated content can be sequentially specified, and a presentation screen shown in FIG. 3 or 4 can be shown in the user device 14 based on the result of the sequential designations.

According to this embodiment, in which the indirectly related content of the content designated by the user can be specified using the SS table, and presented to the user, mutually related contents can be more reliably selected and presented to the user, irrespective of the content of the character string directly related to the content via the metadata.

It should be note that the present invention is not limited to the above described embodiment. For example, although it is described in the above embodiment that an SC table is produced based on the CS table, the SC table, or a table describing, for every character string, one or more contents related to that character string, may be produced based on the content directly related character string data output from the character string extraction unit 23.

What is claimed is:

1. A content presentation device having a processor, comprising:
   presentation screen production means for producing, on a display device, display data related to a presentation screen on which images representative of a subset of contents among a plurality of contents together with a mutual relationship among the subset are shown, based on presentation data stored in presentation data storage means, the presentation storage means storing plural kinds of presentation data in a memory by which the mutual relationship of the contents is represented, based on any of which display data about the presentation screen is produced; and
   instruction determination means for determining whether a switching instruction for switching the presentation screen is input while the presentation screen is displayed, the switching instruction designating one of the contents represented by one of the images shown on the presentation screen,
   wherein the presentation screen production means displays, on the display device, an image representative of the one of the contents designated by the switching instruction at a predetermined position of the presentation screen, and
   produces, when the switching instruction is input, display data about the presentation screen where the images representative of the subset of contents among the plurality of contents, including the one of the contents designated by the switching instruction, together with the mutual relationship among the subset are shown, based on another kind of presentation data stored in the presentation data storage means, the another kind of presentation data being different than the presentation data when the switching instruction is input,
   wherein the another kind of presentation data is retrieved from a different database on the memory than the presentation data, and
   wherein the mutual relationship shown in the presentation screen is changed by the switching instruction; and
   wherein a second kind of presentation data among the plurality kinds of presentation data is data describing positions at which images representative of respective content of the plurality of contents are placed in the virtual three dimensional space on the surface of a spherical object, and
   the presentation screen production means determines, when display data of the presentation screen based on the second kind of presentation data is produced, a viewpoint and a viewing direction such that a position, at which an image representative of the content concerning the designation which is made when issuing the switching instruction is placed, is contained in a field of view range, and produces an image representative of the virtual three dimensional space according to the viewpoint and the viewing direction, to thereby produce display data about the presentation screen where the images representative of the subset of contents of the plurality of contents, including the content concerning the designation which is made when issuing the switching instruction, are shown on the surface of the spherical object.

2. The content presentation device according to claim 1, wherein
   a first kind of presentation data among the plurality kinds of presentation data is data describing one or more contents related to respective content of the plurality of contents, and
   the presentation screen production means produces, when display data of a presentation screen based on the first kind of presentation data is produced, display data about the presentation screen where an image representative of content concerning the designation which is made when issuing the switching instruction and images representative of contents related to that content are shown.

3. The content presentation device according to claim 1, wherein the viewpoint and the viewing direction in the virtual three dimensional space are determined such that a position at which an image representative of at least one content, other than the content concerning the designation which is made when issuing the switching instruction, is placed, among the contents represented by the images shown on a presentation screen which is shown before switching, is included in the field of view range.

4. The content presentation device according to claim 1, further comprising:
   related character string storage means for storing, so as to correspond to each of a plurality of character strings, at least one character string related to that character string;
   content related character string acquisition means for acquiring, for each of the plurality of contents, at least one character string related to that content; and
   related content selection means for selecting, according to the at least one character string related to respective content of the plurality of contents acquired by the content related character string acquisition means and the at least one character string related to respective character strings of the plurality of character strings stored in the related character string storage means, at least one content which is made related to predetermined content among the plurality of contents, based on content stored in the related character string storage means.

5. The content presentation device according to claim 4, further comprising
display data output means for outputting display data for displaying relevance between the content selected by the related content selection means and the predetermined content.

6. The content presentation device according to claim 4, wherein
the related content selection means
includes content related character string storage means for storing, for each of the plurality of contents, at least one character string stored in the related character string storage means so as to correspond to at least one character string related to that content acquired by the content related character string acquisition means, and
selects at least one content which is made related to the predetermined content according to content stored in the content related character string storage means.

7. The content presentation device according to claim 6, wherein the related content selection means selects at least one content which is made related to the predetermined content according to the content stored in the related character string storage means.

8. The content presentation device according to claim 4, further comprising
related character string update means for updating the content stored in the related character string storage means, based on data stored in another device connected via a network to the content presentation device.

9. A content presentation method, comprising:
a step of producing display data related to a presentation screen on which images representative of a subset of contents among a plurality of contents together with a mutual relationship among the subset are shown, based on presentation data stored in presentation data storage means, the presentation storage means storing plural kinds of presentation data by which the mutual relationship of the contents is represented, based on any of which display data about the presentation screen is produced;
a step of determining whether a switching instruction for switching the presentation screen is input while the presentation screen is displayed, the switching instruction designating one of the contents represented by one of the images shown on the presentation screen; and
a step of displaying an image representative of the one of the contents designated by the switching instruction at a predetermined position of the presentation screen,
producing, when the switching instruction is input, display data about the presentation screen where the images representative of the subset of contents among the plurality of contents, including the one of the contents designated by the switching instruction, together with the mutual relationship among the subset are shown, based on another kind of presentation data stored in the presentation data storage means, the another kind of presentation data being different than the presentation data when the switching instruction is input,
wherein the another kind of presentation data is retrieved from a different database than the presentation data,
wherein the mutual relationship shown in the presentation screen is changed by the switching instruction; and
wherein a second kind of presentation data among the plurality kinds of presentation data is data describing positions at which images representative of respective content of the plurality of contents are placed in the virtual three dimensional space on the surface of a spherical object; and
determining, display data of the presentation screen based on the second kind of presentation data is produced, a viewpoint and a viewing direction such that a position, at which an image representative of the content concerning the designation which is made when issuing the switching instruction is placed, is contained in a field of view range, and produces an image representative of the virtual three dimensional space according to the viewpoint and the viewing direction, to thereby produce display data about the presentation screen where the images representative of the subset of contents of the plurality of contents, including the content concerning the designation which is made when issuing the switching instruction, are shown on the surface of the spherical object.

10. A non-transitory computer-readable information storage medium storing a program for causing a computer to function as:
presentation screen production means for producing display data related to a presentation screen on which images representative of a subset of contents among a plurality of contents together with a mutual relationship among the subset are shown, based on presentation data stored in presentation data storage means, the presentation storage means storing plural kinds of presentation data by which the mutual relationship of the contents is represented, based on any of which display data about the presentation screen is produced; and
instruction determination means for determining whether a switching instruction for switching the presentation screen is input while the presentation screen is displayed, the switching instruction designating one of the contents represented by one of the images shown on the presentation screen,
wherein the presentation screen production means displays an image representative of the one of the contents designated by the switching instruction at a predetermined position of the presentation screen, and
produces, when the switching instruction is input, display data about the presentation screen where the images representative of the subset of contents among the plurality of contents, including the one of the contents designated by the switching instruction, together with the mutual relationship among the subset are shown, based on another kind of presentation data stored in the presentation data storage means, the another kind of presentation data being different than the presentation data when the switching instruction is input,
wherein the another kind of presentation data is retrieved from a different database than the presentation data, and
wherein the mutual relationship shown in the presentation screen is changed by the switching instruction; and
wherein a second kind of presentation data among the plurality kinds of presentation data is data describing positions at which images representative of respective content of the plurality of contents are placed in the virtual three dimensional space on the surface of a spherical object, and
the presentation screen production means determines, when display data of the presentation screen based on the second kind of presentation data is produced, a viewpoint and a viewing direction such that a position, at which an image representative of the content concerning the designation which is made when issuing the switching instruction is placed, is contained in a field of view range, and produces an image representative of the virtual three dimensional space according to the viewpoint and the viewing direction, to thereby produce display data about the presentation screen where the images representative of the subset of contents of the plurality of contents, including the content concerning the designation which is made when issuing the switching instruction, are shown on the surface of the spherical object.

* * * * *